Aug. 15, 1933.    C. BRECHT    1,922,567
PICTURE FRAME
Filed April 5, 1933
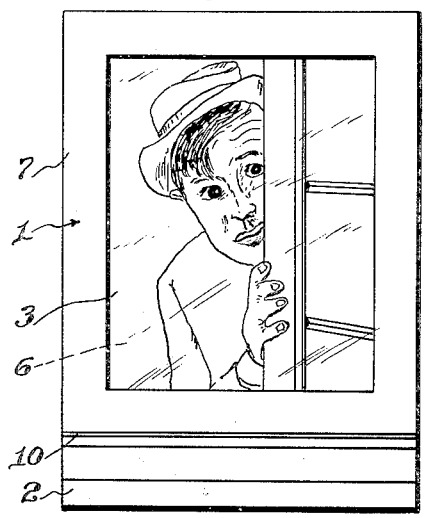
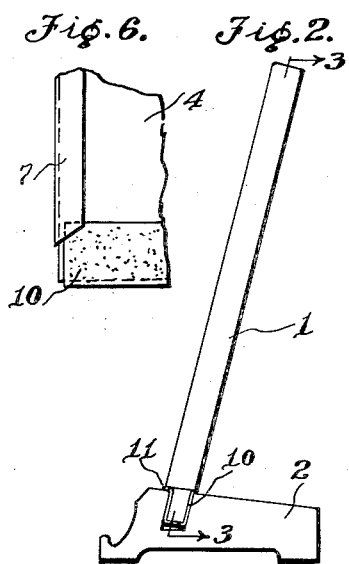
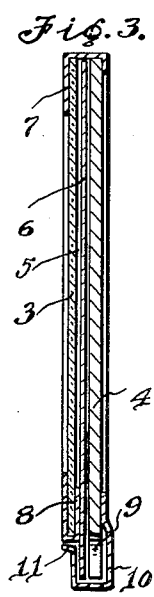
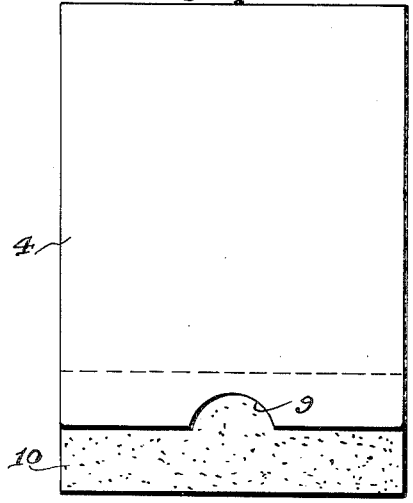
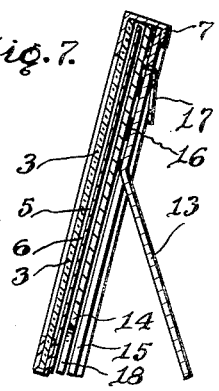
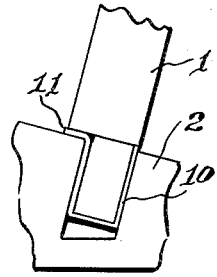
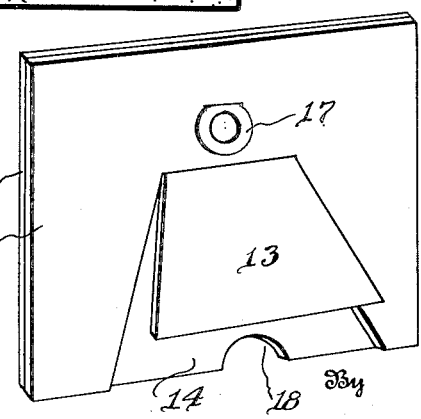
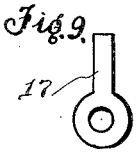
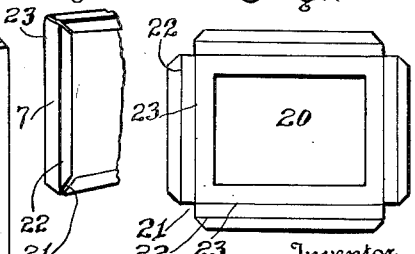
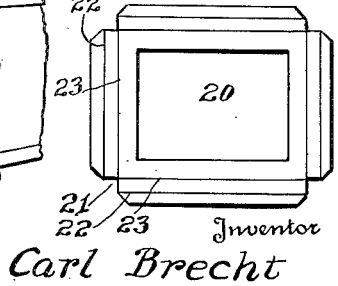
Inventor
Carl Brecht
By J. Kaplan
Attorney Patented Aug. 15, 1933

1,922,567

UNITED STATES PATENT OFFICE 1,922,567

PICTURE FRAME

Carl Brecht, Indianapolis, Ind.

Application April 5, 1933. Serial No. 664,618

4 Claims. (Cl. 40—148)

This invention relates to picture frames.

The main object of the invention is to provide a picture frame for mounting pictures having means to replace the pictures without taking the frame apart.

Another object of the invention is to provide a stand to properly position the frame.

Still another object of the invention is to provide means to frictionally hold the frame in place in the stand.

Other objects will appear as the disclosure progresses. The drawing is intended to merely indicate a possible embodiment of the invention. It is obvious that the actual needs of manufacture may necessitate certain mechanical changes. It is therefore not intended to limit the invention to the embodiment illustrated but rather to define such limits in the appended claims.

In the drawing:

Figure 1 is a front view of the picture frame.

Figure 2 is a side view of the frame positioned in the stand.

Figure 3 is a section on line 3—3 of Figure 2.

Figure 4 is a rear view of the back plate.

Figure 5 is an enlarged detail showing the bottom portion of the frame inserted in the stand.

Figure 6 is a rear detail of the frame.

Figure 7 is a cross sectional view of a modified form of the frame.

Figure 8 is a perspective view of the rear plates used in the modified form of the invention.

Figure 9 is a view of the hook for supporting the modified form of the frame.

Figure 10 is a view of the binding on a reduced scale which is pasted around the edge of the structure.

Figure 11 is a fragmentary perspective rear view showing the binding attached to the structure.

Referring now to the drawing in detail, numeral 1 designates the frame and 2 the stand for correctly positioning the frame. The frame includes a glass front 3 and a back plate 4. Between the glass front and the back plate is a space 5 for the insertion of the picture 6. Surrounding the entire outer edge of the top and sides of the frame is a binding 7. The bottom edge of the frame is also covered with the same binding however it is tucked in between the glass front and the picture as at 8. In the bottom of the back plate is a cut-out portion 9 for the insertion of the finger when removing the picture.

Pasted to the bottom of the back plate 4 is a strip of soft and rough material 10. This piece of material is adapted to be folded around the bottom edge of the backing and picture. The bottom portion of the frame which is surrounded by the strip 10 fits into a slot 12 cut at an angle in the stand 2. The strip 10 frictionally and resiliently engages the sides of the slot and holds the frame tightly in place which can be removed from and replaced in the slot without becoming loose. The free end 11 of the strip 10 protrudes out of the slot so the said end will not get caught and tear when removing the picture from the stand.

In Figure 7 is shown a modified form of the invention in which the stand is dispensed with and instead there is a flap 13 to hold the frame in place in an inclined position. The front part of the frame, namely the recess 5 for the picture 6, the glass front 3 and the binding 7 are the same as that shown in Figure 1. However the rear portion of the frame is different. Said rear portion comprises two members 14 and 15 pasted together by glue or paste 16. Between the members near the top is a hook 17 to support the frame by a nail if desired instead of by the flap 13. At the bottom of the member 14 is a cut-out portion 18 to facilitate the removal of the picture. The flap 13 is cut in the member 15 and normally covers the cut-out portion 18 when the flap is not in use.

The binding 7 shown in Figure 10 is made of one piece of material with an opening 20 to expose the picture and having cut-outs 21 at the corners. When applying the binding it is folded along the lines 22 and 23. The distance between the lines 22 and 23 represents the width of the complete structure. This form of binding may be used with the frames having a slit at the bottom for the removal of the picture as shown in Figures 1 and 7 or with the frame shown in Figure 11 without the bottom slot. With the latter frame all the four sides or edges are fully sealed against dust or dirt. The inside face of the binding may be pre-gummed and then moistened and pasted in place or it may be pasted in place directly with paste or other adhesive substance.

It will thus be seen that I have provided a simple and convenient method of mounting a picture and means for supporting the frame. The picture can easily be removed or replaced without taking the frame apart.

Having described my invention, I claim:

1. In a frame of the class described, a glass front, a backing, a pocket between said backing and said glass front, a picture in said pocket, a binding surrounding the sides of said glass front and said backing, said backing consisting of two pieces of material glued together, and a flap in the outer one of said two pieces of material to support the frame.

2. In a frame of the class described, a glass front, a backing, a pocket between said backing and said glass front, a picture in said pocket, a binding surrounding the sides of said glass front and said backing, said backing consisting of two pieces of material glued together, a flap in the outer one of said two pieces of material to support the frame, a hook at the rear of said backing, the inner end of said hook anchored between the two pieces of material forming the backing.

3. In a frame of the class described, a glass front, a backing, a pocket between said backing and said glass front, a picture in said pocket, a binding surrounding the sides of said glass front and said backing, said backing consisting of two pieces of material glued together, and a flap in the outer one of said two pieces of material to support the frame, said flap cut from and being a part of the said outer piece of material.

4. In a frame of the class described, a glass front, a backing, a pocket between said backing and said glass front, a picture in said pocket, a binding surrounding the sides of said glass front and said backing, said backing consisting of two pieces of material in contact with each other, and a flap in the outer one of said two pieces of material to support the frame.

CARL BRECHT.